US008111345B2

(12) United States Patent
Ono

(10) Patent No.: US 8,111,345 B2
(45) Date of Patent: Feb. 7, 2012

(54) DISPLAY DEVICE COMPRISING A FIRST POSITIONING WALL HAVING A HEIGHT LARGER THAN THE HEIGHT OF THE BONDING SURFACE OF THE SUBSTRATES AND A SECOND POSITIONING WALL HAVING A HEIGHT SMALLER THAN THE HEIGHT OF THE BONDING SURFACE

(75) Inventor: Shin-ichirou Ono, Kanagawa (JP)

(73) Assignee: NLT Technologies, Ltd. (JP)

( * ) Notice: Subject to any disclaimer, the term of this patent is extended or adjusted under 35 U.S.C. 154(b) by 602 days.

(21) Appl. No.: 11/676,132

(22) Filed: Feb. 16, 2007

(65) Prior Publication Data
US 2007/0195220 A1 Aug. 23, 2007

(30) Foreign Application Priority Data

Feb. 17, 2006 (JP) .................................. 2006-041312
Feb. 16, 2007 (JP) .................................. 2007-036416

(51) Int. Cl.
*G02F 1/1333* (2006.01)
*H04N 5/64* (2006.01)
(52) U.S. Cl. ......................................... 349/58; 348/794
(58) Field of Classification Search .................... 349/58, 349/59, 60; 348/794
See application file for complete search history.

(56) References Cited

U.S. PATENT DOCUMENTS

| 5,710,607 A * | 1/1998 | Iwamoto et al. ................. 349/60 |
| 2001/0026334 A1* | 10/2001 | Natsuyama ...................... 349/58 |
| 2002/0089618 A1* | 7/2002 | Ahn ................................. 349/58 |
| 2004/0160549 A1* | 8/2004 | Park ................................. 349/61 |

FOREIGN PATENT DOCUMENTS

| JP | 2000-4087 | 1/2000 |
| JP | 2001-4983 | 1/2001 |

* cited by examiner

*Primary Examiner* — Mark Robinson
*Assistant Examiner* — Dennis Y Kim
(74) *Attorney, Agent, or Firm* — Hayes Soloway P.C.

(57) ABSTRACT

A LCD device includes a LC panel unit including TFT and counter substrates, and a backlight unit on which the LC panel unit is mounted. The backlight unit has a plurality of positioning ribs protruding from the backlight unit in the vicinity of the corners of the display panel for positioning the display panel. Some of the positioning ribs have a first positioning wall having a height larger than the height of the boundary between the TFT substrate and the counter substrate in a first display area in which the edge of the TFT substrate protrudes from the edge of the counter substrate. Others of the positioning ribs have a second positioning wall having a height lower than the height of the boundary between the TFT substrate and the counter substrate in a second display area in which the edge of the TFT substrate is flush with the edge of the counter substrate.

15 Claims, 18 Drawing Sheets

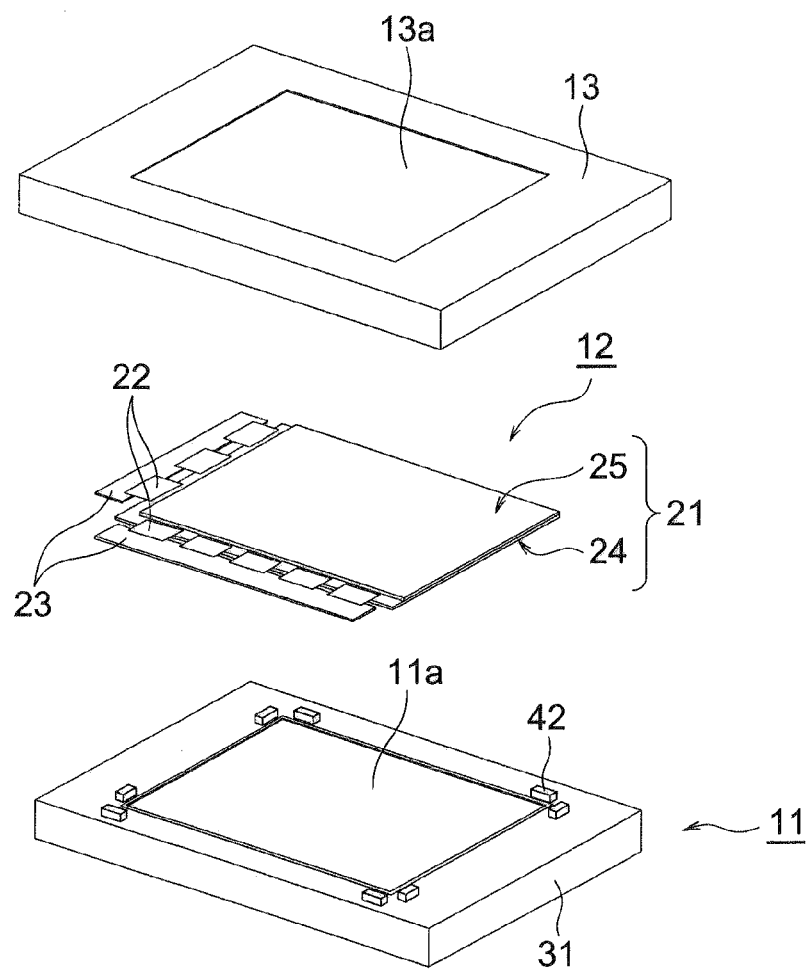

US 8,111,345 B2

DISPLAY DEVICE COMPRISING A FIRST POSITIONING WALL HAVING A HEIGHT LARGER THAN THE HEIGHT OF THE BONDING SURFACE OF THE SUBSTRATES AND A SECOND POSITIONING WALL HAVING A HEIGHT SMALLER THAN THE HEIGHT OF THE BONDING SURFACE

This application claims priority to Japanese Patent Application No. 2006-041312 filed Feb. 17, 2006 and Japanese Patent Application No. 2007-036416 filed Feb. 16, 2007.

BACKGROUND OF THE INVENTION

1. Field of the Invention

The present invention relates to a display device, and more particularly to a display device including a backlight unit having positioning ribs formed on the luminescent surface thereof and a panel unit mounted on the luminescent surface of the backlight unit wherein the position of the panel unit is defined by the positioning ribs.

2. Description of the Related Art

In general, a liquid-crystal display (LCD) device has a structure configured by sandwiching a liquid-crystal (LC) panel unit between a backlight unit and a shield front. FIG. 17 is a perspective view showing the configuration of a conventional LCD device as observed from the front side. FIG. 18 is an exploded perspective view of the LCD device of FIG. 17. The LCD device 100 includes a backlight unit 11 having a rectangular luminescent surface 11a on the front side, a LC panel unit 12 mounted on the luminescent surface 11a and having a light-switching function, and a shield front 13 defining a display surface 13a for the panel unit 12.

The LC panel unit 12 includes a display panel 21, a plurality of TCPs (Tape Carrier Packages) 22 coupled to the display panel 21, and a circuit board 23 coupled mechanically and electrically to the TCPs 22. ICs for driving the display panel 21 are mounted on the TCPs 22, and the circuit board 23 outputs control signals controlling the drive of the display panel 21 by the TCPs 22.

The display panel 21 includes a LC layer (not shown), front and rear transparent substrates 24, 25 bonded together at a bonding surface to sandwich therebetween the liquid crystal layer, and a pair of polarizing plates (not shown) disposed on the external surface of the transparent substrates 24, 25. The display panel 21 has thereon a plurality of pixels defined in a two-dimensional array. The rear substrate 24 is configured as an active matrix substrate, mounting thereon switching elements such as TFTs (Thin Film Transistors) and the like disposed in a matrix for controlling the switching of the pixels. The rear substrate 24 is thus hereinafter referred to as TFT substrate 24. The front substrate 25 mounts thereon color filters (CFs) having a color which corresponds to each pixel, and is hereinafter referred to as a counter substrate or CF substrate 25. By driving the TFT elements via the circuit board 23 and the TCPs 22, the display panel is controlled for each pixel.

The TCPs 22 and the circuit board 23 are disposed, for example, on the periphery of the display panel 21 along two adjacent sides of the rectangular display panel 21. On these two sides, the edge of the TFT substrate 24 protrudes from the edge of the counter substrate 25 as observed normal to the display panel 21, and the TCPs 22 are coupled to the peripheral area of the TFT substrate 24 exposed from the edge of the counter substrate 25.

The backlight unit 11 is provided with, on the front side thereof, a frame-like backlight chassis 31 defining the luminescent surface 11a of the backlight unit 11. On the backlight chassis 31, a positioning rib set including a plurality of positioning ribs 42 is formed in the vicinity of four corners of the luminescent surface 11a for defining the position of the display panel 21. A pair of positioning ribs 42 are formed on each corner of the display panel 21, with the corner being interposed between the pair of positioning ribs 42. Each rib has a shape of elongated cuboid and is disposed along an edge of the display panel 21. Further, in consideration of the range of variation of the peripheral dimensions of the display panel 21 and the range of variation of the distance between the positioning ribs 42, each rib is disposed so as to form a clearance of 0.2 to 0.3 mm between the edge of the display panel 21 and the positioning ribs 42.

FIG. 19A is a top plan view showing the LCD device of FIG. 18 in which the LC panel unit 12 is mounted on the backlight unit 11, and FIG. 19B is a sectional view showing a section taken along line b-b of FIG. 19A. The backlight unit 11 is, for example, an edge-emission type backlight unit, and consecutively includes, on the luminescent surface 11a thereof, an optical sheet 33, a optical guide plate 34 and a reflection sheet (not shown). The backlight unit 11 includes a lamp or light source (not shown) adjacent to both the side edges of the optical guide plate 34. Around the luminescent surface 11a, the backlight chassis 31 has a flat mounting surface 35 on which the TFT substrate 24 is mounted, and a recess 36 formed nearer to the luminescent surface 11a than the mounting surface 35 and being capable of accommodating a polarizing plate 26. Numeral 28 indicates the edge of the display area of the display panel 21.

In the assembly process of the LCD device 100, the four corners of the display panel 21 are positioned so as to be located inside the positioning ribs 42 in the in-plane direction of the display panel 21, and then, the LC panel unit 12 is mounted on the backlight unit 11. In this process, the TFT substrate 24 is mounted on the mounting surface 35 with polarizing plate 26 being received in the recess 36 of the backlight chassis 31. Further, the shield front 13 is overlaid thereon so as to cover the backlight unit 11 and the LC panel unit 12, and is pressed down to a predetermined position, thereby completing the assembly. The backlight unit 11 and the shield front 13 are fixed to each other by means of screwing, caulking, pawl fitting or the like.

It is known that the conventional LCD device 100 incurs the problem of poor image quality in which shadow of dust is projected onto the display surface 13a due to the dust adhered onto the luminescent surface 11a of the backlight unit. This poor image quality is attributable to the following causes. In the LCD device 100, the TFT substrate 24 and the counter substrate 25 is configured by a transparent body such as made of glass, and the edge of the transparent body is not polished, and has minute irregularities such as shown in FIG. 19B by reference numeral 101. Accordingly, if the LCD device 100 is subjected to vibration, the edge of the transparent substrate body, which is in contact with the positioning ribs 42, suffers from abrasion with respect to the same to generate the dust. This dust passes through the gap between the bottom surface of the TFT substrate 24 and the mounting surface 35 of the backlight unit 11, penetrates into the lower part of the display panel 21 and adheres onto the luminescent surface 11a of the backlight unit.

In order to solve the above-described problem, measures of forming an inclined surface on the side of each of the positioning ribs 42 opposing the display panel 21 is employed. FIG. 20 is a sectional view showing the LCD device which has an inclined surface similar to the surface of equivalent to FIG. 19B. In this LCD device 100, the inclined surface 112 is formed on the side of the display panel 21 opposing the positioning ribs 42.

In the LCD device 100, the height of the boundary between a positioning wall 111 and the inclined surface 112 opposing the edge surface of the display panel 21 is set smaller than the height of the top surface of the TFT substrate 24. As a result thereof, when the edge portion of the display panel 21 is brought into contact with the positioning ribs 42, only a part of the edges of the TFT substrate 24 is in contact with the positioning ribs 42. It is considered to be able to suppress the generation of dust due to friction between the display panel 21 and the positioning ribs 42 by reducing the contact area between the edge of the display panel 21 and the positioning ribs 42. The LCD device in which the inclined surface is formed on the side of the positioning ribs is described, for example, in JP-2001-4983A.

Research was conducted by the inventor for investigating the incidence rate of the poor image quality after actually manufacturing the LCD device 110 of FIG. 20, and it was found in the research that the poor image quality due to the dust cannot be suppressed satisfactorily. The reason why the poor image quality due to the dust cannot be suppressed satisfactorily is conceived as follows.

The display panel 21 is formed by bonding the TFT substrate 24 and the counter substrate 25 together, with a LC layer sandwiched therebetween. Accordingly, depending on processing accuracy of the bonding, the position of the edge of the TFT substrate 24 and the position of the edge of the counter substrate 25 cannot be aligned perfectly, thereby leaving a certain degree of misalignment therebetween. Depending on the bonding surface between the TFT substrate 24 and the counter substrate 25, the edge of the counter substrate 25 may protrude outwards from the edge of the TFT substrate 24.

In the LCD device shown in FIG. 20, the TFT substrate 24 and the counter substrate 25 have a thickness of, for example, 0.7 mm, and in consideration of the range of variation in the dimension of the positioning ribs 42, the boundary between the positioning wall 111 and the inclined surface 112 is set at a height of about 0.5 to 0.6 mm from the mounting surface 35 of the backlight unit so that a part thereof does not contact with the counter substrate 25. The angle of the inclined surface 112 is set, for example, at about 10 to 30° so as to be able to mount the LC panel unit 12 with ease during the assembly of the LCD device 110.

The misalignment between the edge of the TFT substrate 24 and the edge of the counter substrate 25 amounts to, for example, a maximum of about 0.4 mm. Accordingly, in case of largely protruded edge of the counter substrate 25, even if the inclined angle is set at 30°, as shown by the numeral 113 of FIG. 21, the corner of the counter substrate 25 abuts the inclined surface 112 of the positioning ribs 42 before the TFT substrate 24 is brought into contact with the positioning ribs 42. The dust causing the above-described poor image quality is generated by friction between the corner of the counter substrate 25 and the inclined surface 112 of the positioning ribs.

Here, countermeasures can be conceived that the angle of the inclined surface 112 is increased sufficiently for preventing the corner of the counter substrate 25 from contacting with the inclined surface 112 of the positioning ribs. However, according to the simulation of the present inventor, assuming that the misalignment between the edge of the TFT substrate 24 and the edge of the counter substrate 25 amounts to a maximum of 0.4 mm, even if the height of the boundary between the positioning wall 111 and the inclined surface 112 is reduced to a height of 0.5 mm from the mounting surface 35 of the backlight unit, contact of the corner of the counter substrate 25 with the inclined surface 112 of the positioning ribs cannot be prevented unless the inclined angle is set to larger than 68°, as shown in FIG. 22A.

However, if the angle of the inclined surface 112 is excessively large, as shown in FIG. 22B, the LC panel unit 12 is likely to be stopped after overriding the positioning ribs 42 during the assembly of the LCD device 120. Accordingly, if the constituent members such as the shield front 13 are attached onto the LCD device 12 in this situation, there may occur a dimensional error, or the LC panel unit 12 may be damaged due to stresses. In particular, in a LCD device having a display panel 21 of large size, since the LC panel unit 12 is heavy, the LC panel unit 12 is more likely to be stopped on the ribs 42.

SUMMARY OF THE INVENTION

In order to realize a LCD device having an excellent image quality, it is essential to prevent the LC panel unit 12 from overriding on the positioning ribs 42 and to suppress the generation of dust due to abrasion caused by friction between the LC panel unit 12 and the positioning ribs 42.

In view of the above, it is an object of the present invention to provide a display device which is capable of preventing the panel unit from overriding the positioning ribs and suppressing the generation of dust due to friction between the panel unit and the positioning ribs.

The present invention provides, in a first aspect thereof, a display device including: a display panel including first and second substrates consecutively layered on a mounting surface and bonded together at a bonding surface, the display panel having a first panel portion in which an edge of the first substrate protrudes from an edge of the second substrate and a second panel portion in which an edge of the first substrate is substantially flush with an edge of the second substrate; and a positioning rib set protruding from the mounting surface to define a location for the display panel on the mounting surface, the positioning rib set including a first rib having a first positioning wall which opposes an edge of the first panel portion and has a height larger than a height of the bonding surface as observed from the mounting surface, and a second rib having a second positioning wall which opposes an edge of the second panel portion and has a height smaller than a height of the bonding surface as observed from the mounting surface.

The present invention provides, in a second aspect thereof, a display device including: a display panel including first and second substrates consecutively layered on a mounting surface and bonded together at a bonding surface, the display panel having a first panel portion in which an edge of the first substrate protrudes from an edge of the second substrate and a second panel portion in which an edge of the first substrate is substantially flush with an edge of the second substrate; and a positioning rib set protruding from the mounting surface to define a location for the display panel on the mounting surface, the positioning rib set including a first rib having a first positioning wall which opposes an edge of the first panel portion and has a height larger than a height of the bonding surface as observed from the mounting surface, and a second rib having a second positioning wall which opposes an edge of the second panel portion and has a height smaller than a height of the bonding surface as observed from the mounting surface and a retracted wall retracted from the second positioning wall with respect to the edge of the second panel portion.

The present invention provides, in a third aspect thereof, a display panel including a display panel mounted on a mounting surface; and a positioning rib protruding from the mounting surface to define a location for the display panel on the mounting surface, the positioning rib extending along at least a portion of an edge of the display panel and including a plurality of protrusions protruding toward the edge of the display unit. The protrusions may have a circular surface or an edged surface.

The present invention providers, in a fourth aspect thereof, a display device including: a display panel including first and second substrates consecutively layered on a mounting surface and bonded together at a bonding surface; and a positioning rib protruding from the mounting surface to define a location for the display panel on the mounting surface, at least a portion of the positioning rib having a positioning wall which opposes an edge of the display panel, and a groove formed on the positioning wall in a height adjacent to the bonding surface.

In accordance with the display device of the first aspect, for example, of the present invention, the first positioning wall of the first rib having a lager height than the bonding surface suppresses the first panel portion of the display panel from overriding onto the first rib. The second positioning wall of the second rib having a smaller height than the bonding surface allows only a portion of the display panel to abut the second rib. Thus, the present invention reduces the contact area between the display panel and the rib assembly, thereby suppressing occurrence of dust caused by friction or abrasion of the display panel.

In accordance with the display device of the second to fourth aspects of the present invention, the positioning rib set formed in the display device provides an advantage similar to the advantage of the first aspect of the present invention.

In the present invention, the rib set may be formed integrally with the mounting surface, or may be formed separately from the mounting surface. The mounting surface may be configured by a backlight unit or other mounting unit.

The above and other objects, features and advantages of the present invention will be more apparent from the following description, referring to the accompanying drawings.

BRIEF DESCRIPTION OF THE DRAWINGS

FIG. 18 is an exploded perspective view showing the LCD device of FIG. 17;

DETAILED DESCRIPTION OF THE PREFERRED EMBODIMENTS

Figure 1:
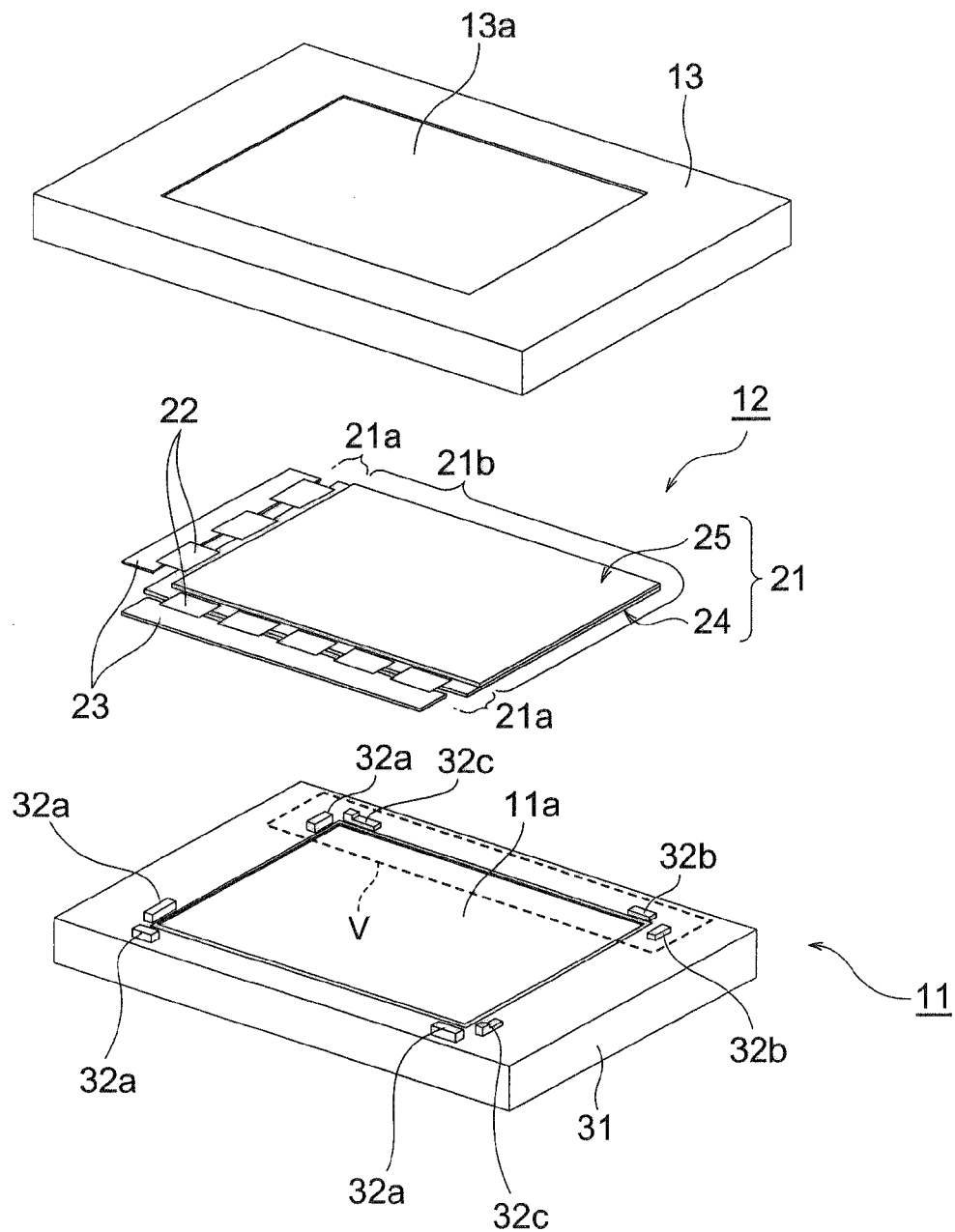
FIG. 1 is an exploded perspective view showing a LCD device according to a first embodiment of the present invention.
Figure 17:
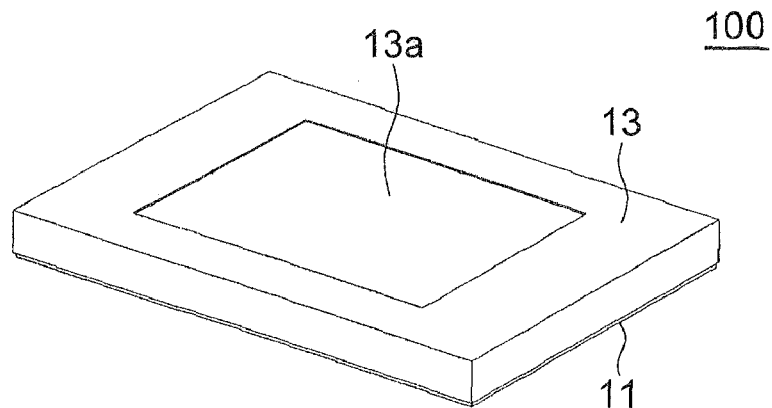
FIG. 17 is a perspective view showing the configuration of a conventional LCD device.
Figure 19A:
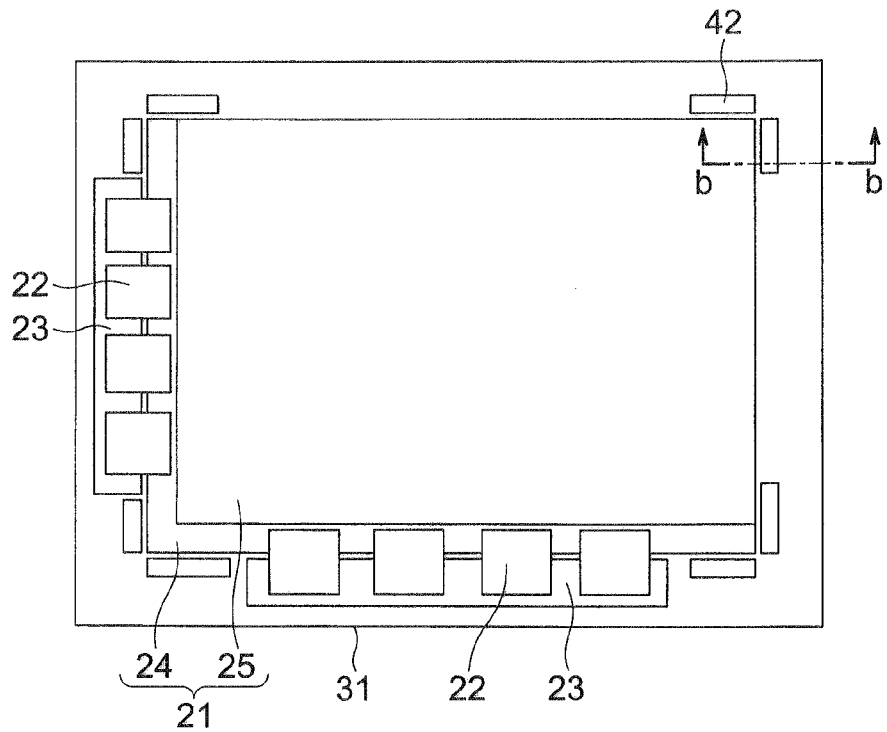
FIG. 19A is a top plan view showing a condition in which a LC panel unit is mounted on the backlight unit in the LCD device of FIG. 18.
Figure 19B:
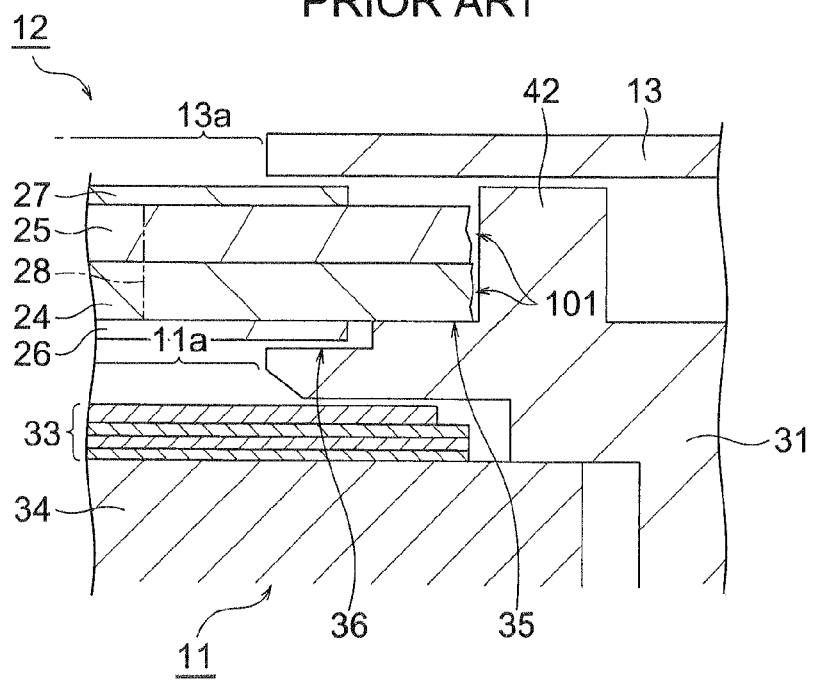
FIG. 19B is a sectional view taken along the line b-b of FIG. 19A.
Figure 20:
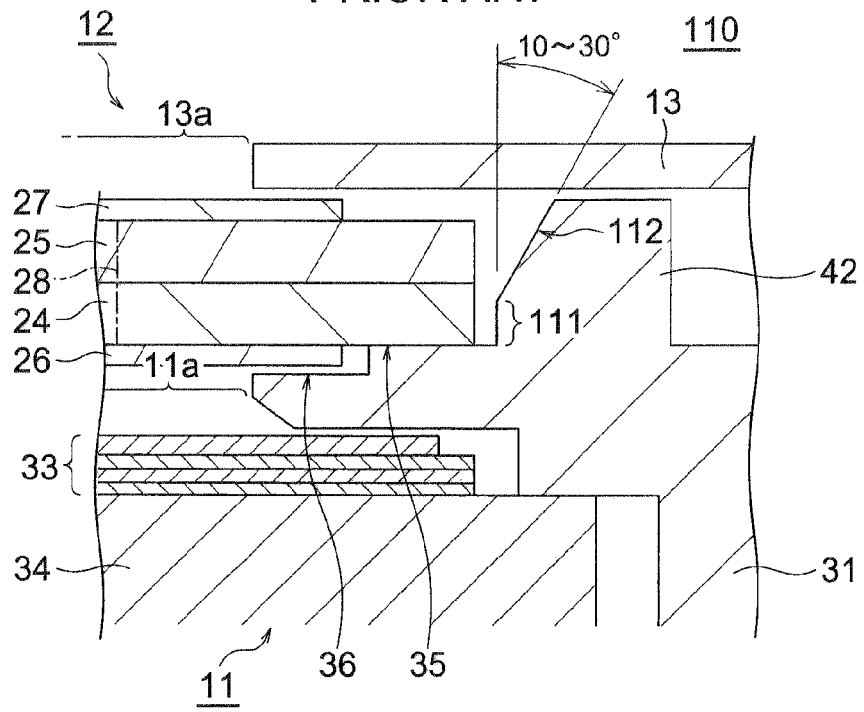
FIG. 20 is a sectional view showing the configuration of another conventional LCD device.
Figure 21:
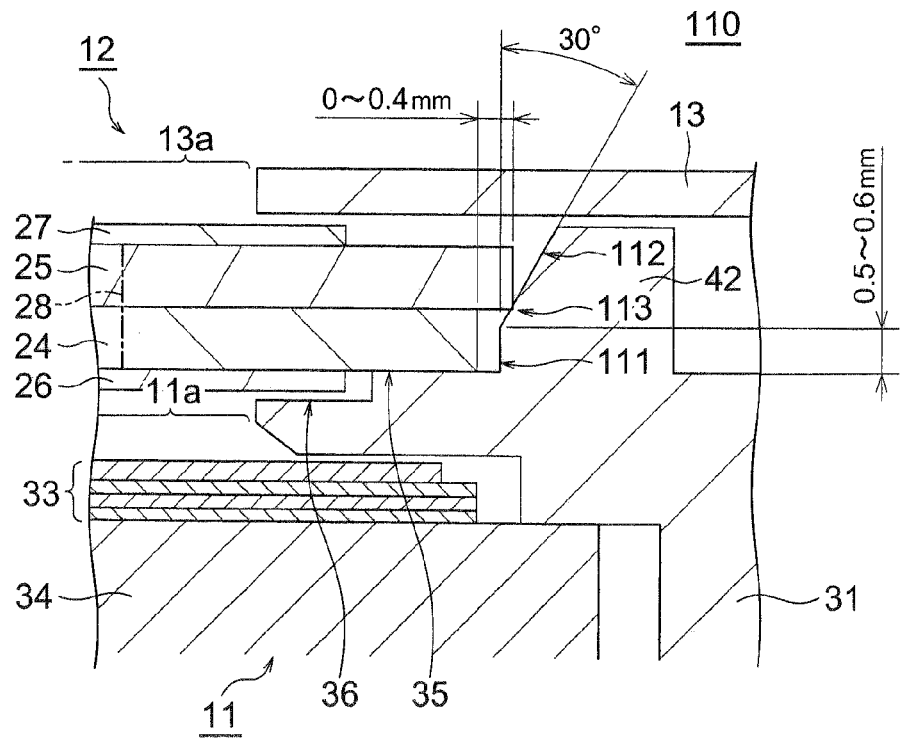
FIG. 21 is a sectional view showing the problems of the LCD device of FIG. 20.
Figure 22A:
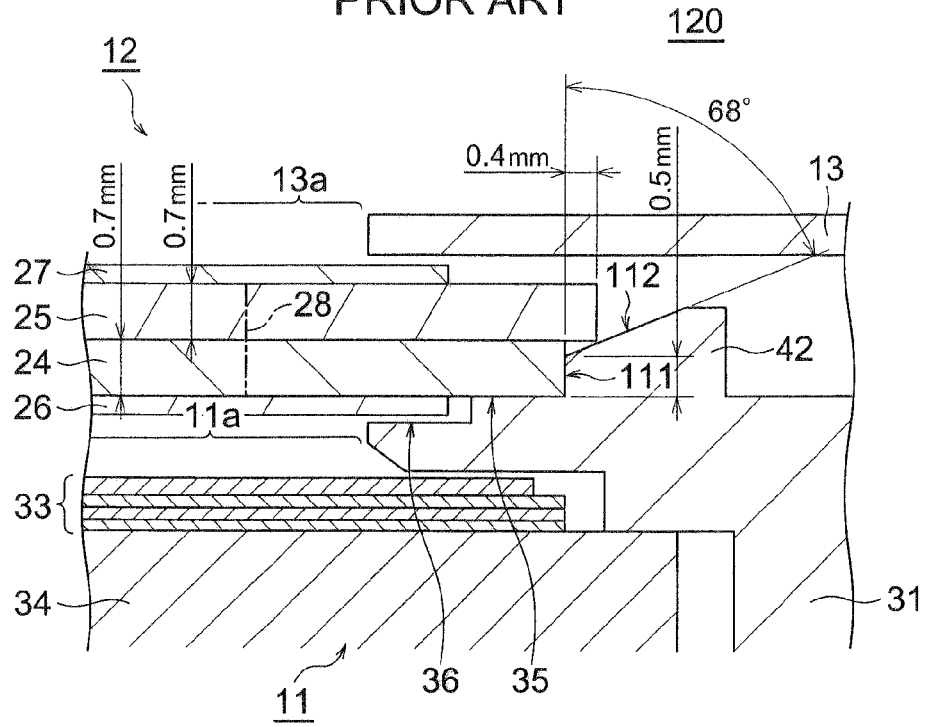
FIG. 22A is a sectional view showing the configuration of a LCD device having an inclined surface of which the inclination angle is different from that of the inclined surface of the LCD device of FIG. 20.
Figure 22B:
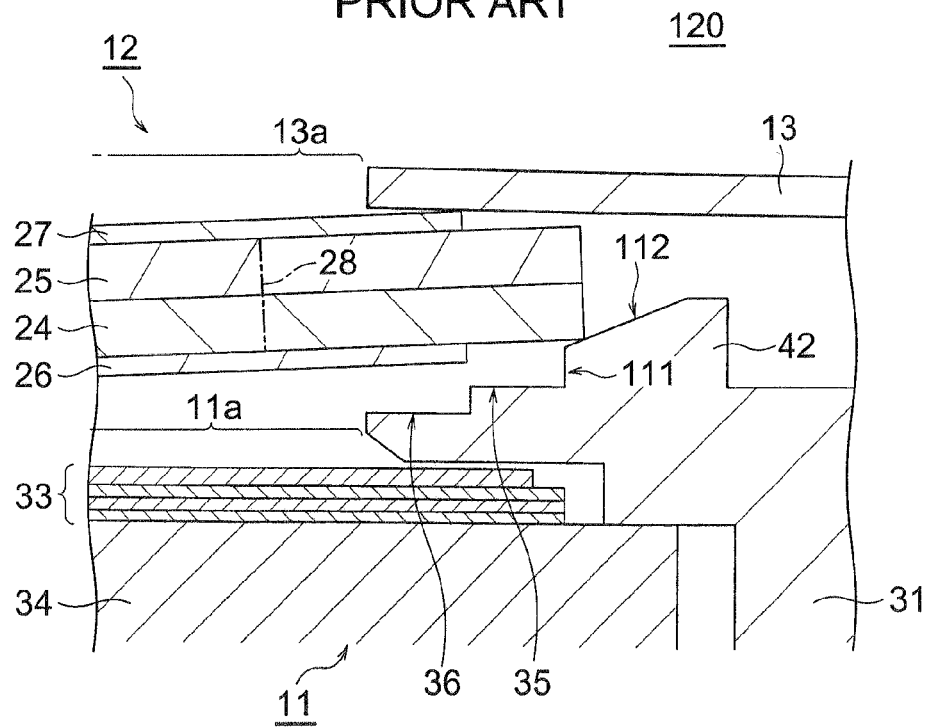
FIG. 22B is a sectional view showing the problems of the LCD device of FIG. 22A.

Now, the present invention will be described further in detail with reference to the accompanying drawings and based on embodiments of the present invention. Similar constituent elements are designated by similar reference numerals throughout the drawings. FIG. 1 is an exploded perspective view of a LCD device according to a first embodiment of the present invention. The LCD device, generally designated at numeral 10, has a configuration similar to that of the conventional LCD device 100 shown in FIGS. 17 to 19 except for the shape of the positioning ribs formed on the backlight unit 11.

In the display panel 21, the TFT substrate 24 shown as the bottom side of the display panel unit 12 has an edge protruding from the edge of the counter substrate 25 shown as the top side of the display panel unit 12, on two adjacent sides of the rectangular display panel 21 to which TCPs 22 are connected. The TFT substrate 24 has an edge aligned with the edge of the counter substrate on the remaining two adjacent sides of the display unit 12. In other words, the edge of the display panel 21 includes a first edge portion 21a in which the edge of the TFT substrate 24 protrudes from the corresponding edge of the counter substrate 25, and a second edge portion 21b in which the edge of the TFT substrate 24 is substantially flush with the corresponding edge of the counter substrate 25.

In the present embodiment, a positioning rib set 32 for positioning the display panel 21 includes positioning ribs of first through third types, wherein the first type rib 32a has a first height, the second type rib 32b has a second height smaller than the first height, and the third type rib 32c is a combination of the first and second type ribs, i.e., has a portion having the first height and another portion having the second height. The first height is determined corresponding to the first edge portion 21a, i.e., the edge of the first panel portion, and the second height is determined corresponding to the second edge portion 21b, i.e., the edge of the second panel portion, as will be described hereinafter.

Figure 2:
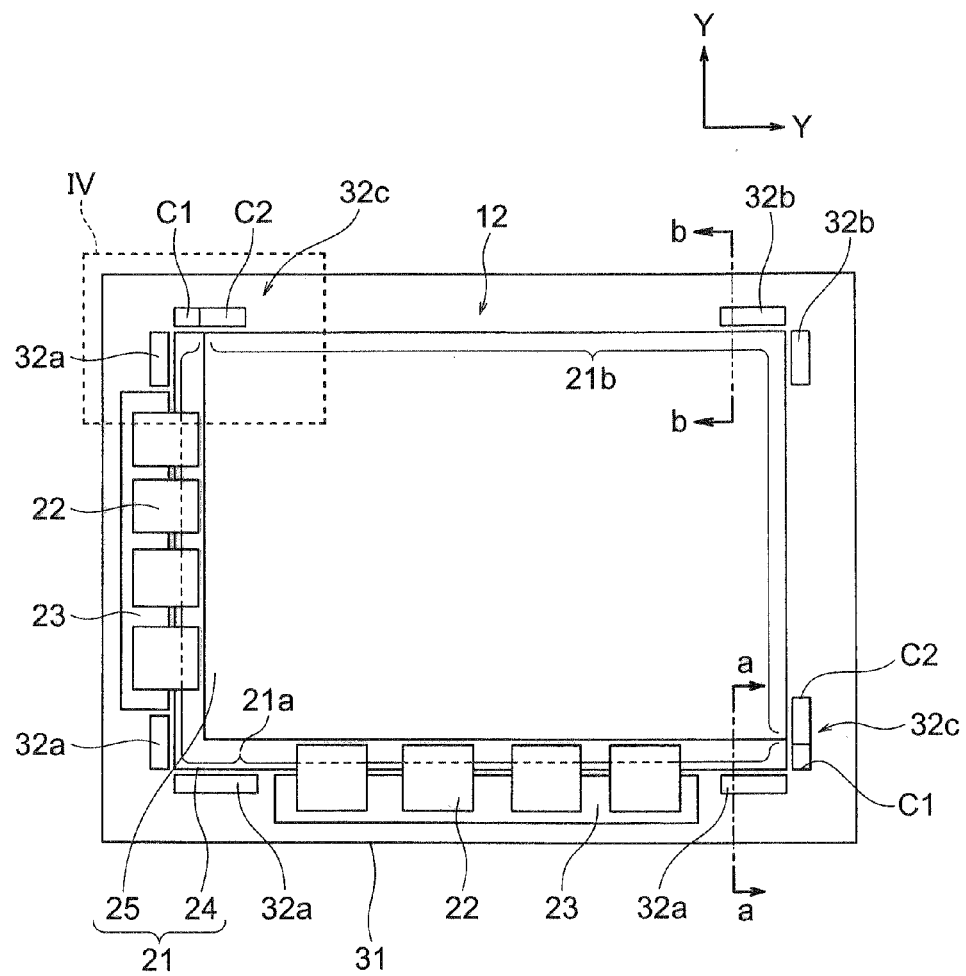
FIG. 2 is a top plan view showing a state in which a LC panel unit is mounted on the backlight unit in the LCD device of FIG. 1.

FIG. 2 shows detail of the LCD device 10 of FIG. 1, wherein the LCD panel unit 12 shown in FIG. 1 is mounted on the backlight unit 11 within the space defined by the positioning ribs 32a, 32b, 32c. The first type rib 32a is disposed along the side of the display panel 21 to which the TCPs 22 are connected and has the first height, the second type rib 32b is disposed along the side of the display panel 21 to which no TCPs 22 are connected and has the second height, and the third type rib 32c is disposed along the side of the display panel 21 to which no TCPs 22 are connected and includes the first portion C1 having the first height and the second portion C2 having the second height. The third type rib 32c is disposed at the boundary between the first edge portion 21a and the second edge portion 21b, with the first portion C1 corresponding to the first edge portion 21a and the second portion C2 corresponding to the second edge portion 21b.

Figure 3A:
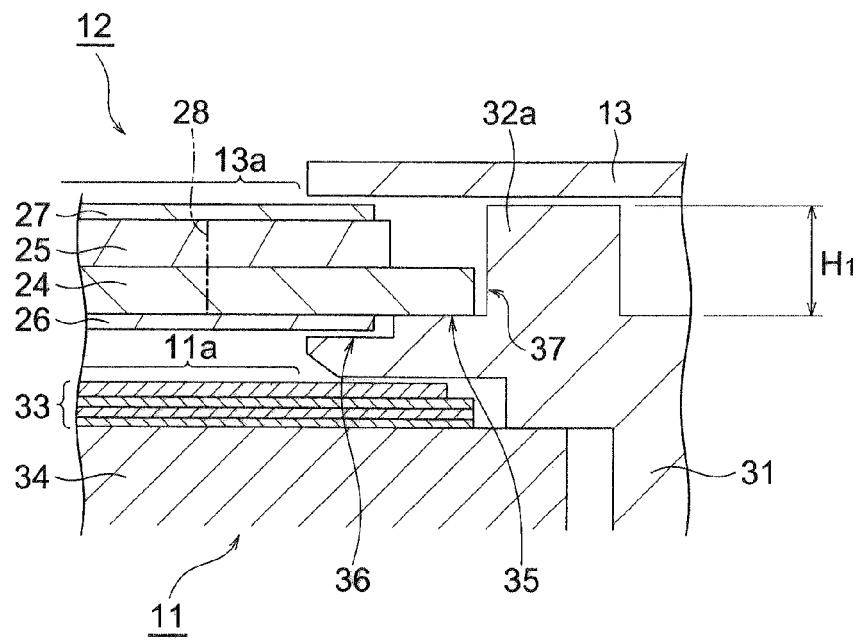
FIGS. 3A and 3B are sectional views taken along lines a-a and b-b, respectively, in FIG. 2.
Figure 3B:
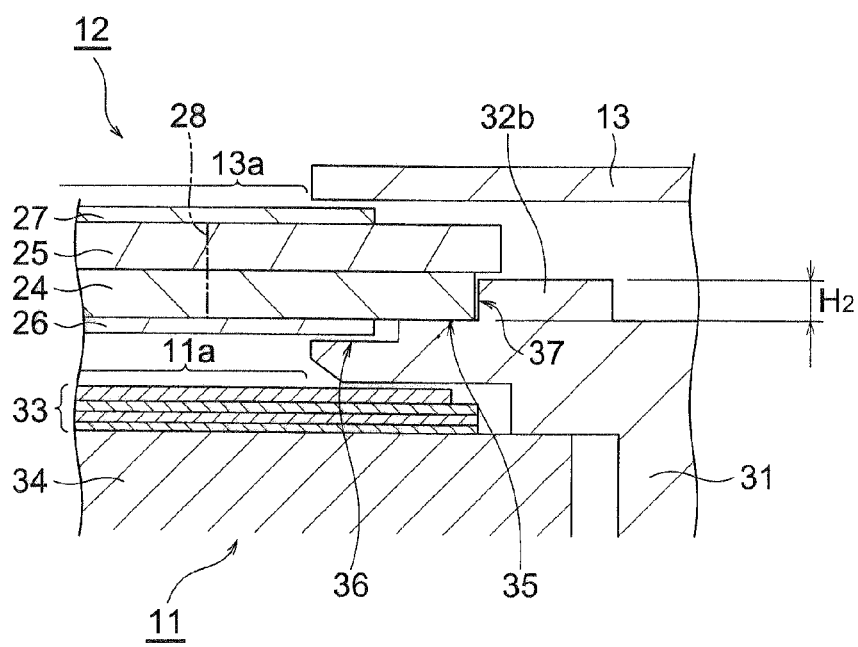

FIGS. 3A and 3B are sectional views taken along lines a-a and b-b, respectively, shown in FIG. 2. The first type rib 32a, as shown in FIG. 3A, has a positioning wall 37 having a height substantially equal to the height of the top surface (outer surface) of the counter substrate 25, or equal to the thickness of the display panel unit 12. The second type rib 32b, as shown in FIG. 3B, has a positioning wall 37 having a height lower than the height of the top surface (inner surface) of the TFT substrate 24, or smaller than the thickness of the TFT substrate 24. The TFT substrate 24 and the counter substrate 25 have a thickness of, for example, 0.7 mm, and the polarizing plates 26, 27 have a thickness of, for example, 0.2 mm. In FIG. 3A, the first type rib 32a has a height $H_1$ of 1.6 mm, for example, and in FIG. 3B, the second type rib 32b has a height $H_2$ of 0.6 mm, for example.

Figure 4A:
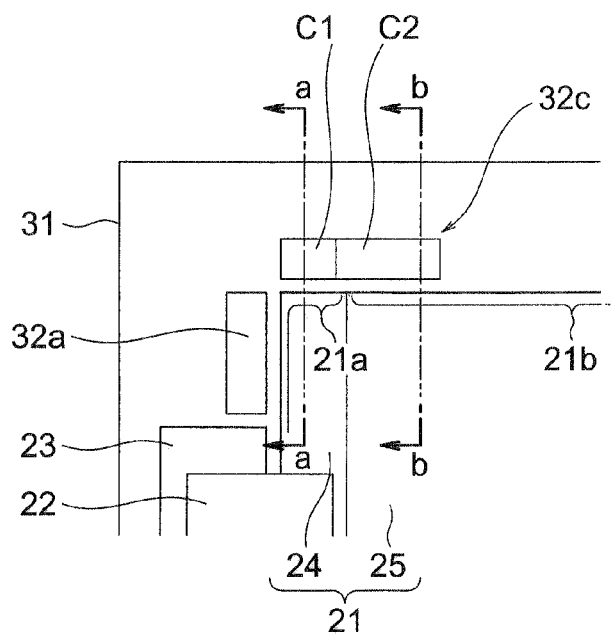
FIG. 4A is an enlarged top plan view showing the portion encircled by the dotted line IV in FIG. 2.
Figure 4B:
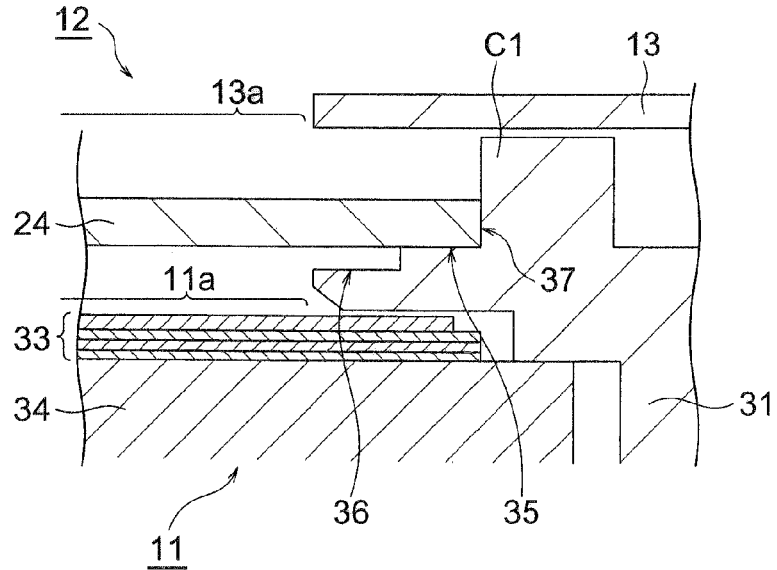
FIG. 4B is a sectional view taken along line a-a of FIG. 4A.
Figure 5:
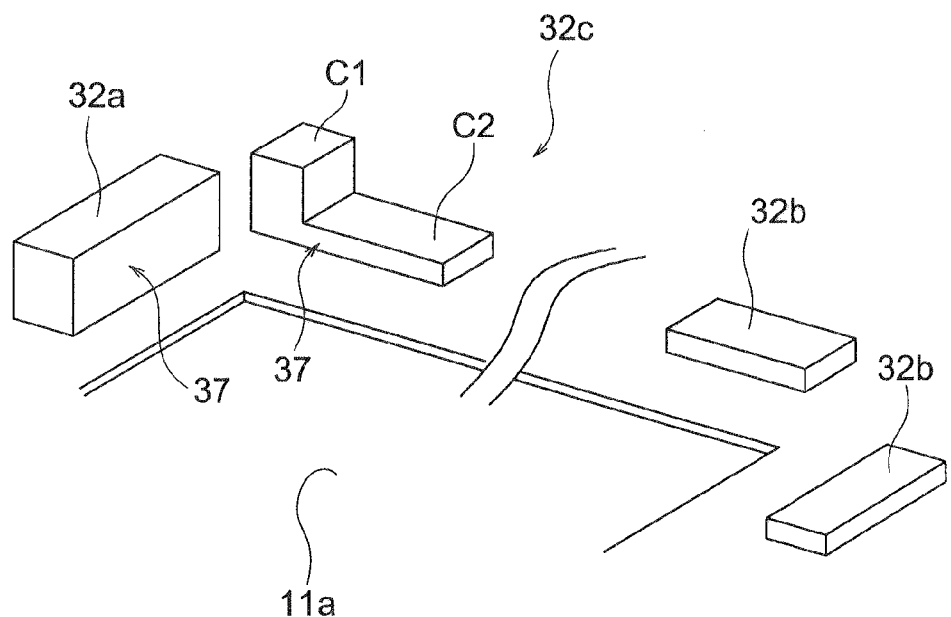
FIG. 5 is an enlarged schematic perspective view showing the portion encircled by the dotted line V in FIG. 1.

FIG. 4A is an enlarged top plan view showing the portion encircled by the dotted line IV shown FIG. 2, and FIG. 4B is a sectional view taken along line a-a shown in FIG. 4A. The section taken along line b-b shown in FIG. 3A is similar to the section shown in FIG. 3B. FIG. 5 is an enlarged schematic view showing the portion encircled by the dotted line V shown in FIG. 1. In the present embodiment, the positioning ribs 32a, 32b, 32c are formed integrally with the backlight chassis 31 by using a molding technique; however, the positioning ribs each may be formed by attaching a rib piece onto the backlight chassis 31 after forming the same.

In the LCD device 10, as shown in FIG. 3A and FIG. 4B, the first type rib 32a and the first portion C1 of the third type rib 32c have a height substantially same as the height of the top surface of the counter substrate 25. By providing a sufficiently large step difference needed for preventing the display panel 21 from overriding the first type rib 32a, the override of the display panel 21 onto the first type rib 32a can be avoided. In FIG. 2, the override of the display panel 21 in the direction opposite to the X-axis direction or Y-axis direction can be avoided by the first type positioning ribs 32a disposed for the first edge portion 12a, and the override in the X-axis direction or Y-axis direction can be avoided by the first portion C1 of the third type positioning ribs 23c disposed for the first edge portion 12a.

In the LCD device 10, the first edge portion 21a of the panel unit 12 including only the TFT substrate 24 opposes or abuts the first type rib 32a and the first portion C1 of the third type rib 32c. Further, as shown in FIG. 3B, since the second type rib 32b is set slightly lower than the top surface of the TFT substrate 24, the second edge portion 21b of the panel unit 12 abuts the second type rib 32b and the second portion C2 of the third type rib 232c only at the TFT substrate 24. This reduces the contact area between the edge portion of the display panel 21 and the positioning ribs 32.

According to the LCD device 10 of the present embodiment, since the first type rib 32a and the first portion of the third type rib 32c have a height substantially same as the height of the top surface of the counter substrate 25, the override of the display panel 21 onto the first type rib 32a can be avoided. Further, since the second type rib 32b has a height slightly lower than the height of the top surface of the TFT substrate 24, the contact area between the edge of the display panel 21 and the positioning ribs 32b can be reduced, thereby suppressing the generation of dust due to friction between the display panel 21 and the positioning ribs 32.

Although the first type rib 32a has a height substantially equal to the height of the top surface of the counter substrate 25, the first edge portion 21a of the panel unit 12 abuts the first type rib 32a only at the TFT substrate 24. This reduces the contact area between the edge portion of the display panel 21 and the positioning ribs 32, thereby suppressing the generation of dust due to friction between the display panel 21 and the positioning ribs 32. That is, the override of the display panel 21 onto the positioning ribs 32 as well as the generation of dust due to friction between the edge portion of the display panel 21 and the positioning ribs 32 can be avoided.

Figure 6:
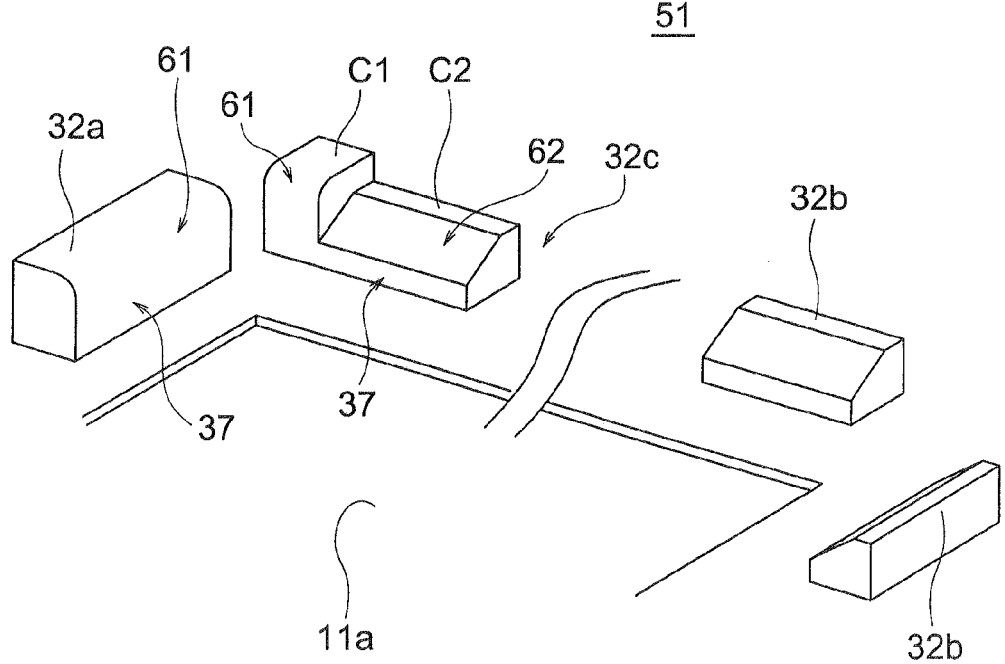
FIG. 6 is a perspective view showing the configuration of a LCD device according to a first modification of the first embodiment, similarly to FIG. 5.

FIG. 6 is a perspective view showing, similarly to FIG. 5, the configuration of a LCD device according to a first modification of the first embodiment. In the LCD device generally designated at numeral 51, the first type rib 32a and the first portion C1 of the third type rib 32c has a round edge opposing to the first edge portion 21a of the display panel 21. The round edge of the first type rib 32a and the first portion C1 of the third type rib 32c effectively suppresses the override of the display panel 21 onto the first type rib 32a or the third type rib 32c. Further, the second type rib 32b as well as the second portion C2 of the third type rib 32c has an inclined edge surface 62 opposing to the second edge portion 21b of the display panel 21 and extending from the positioning wall 37.

In the LCD device 51 of the first modification, the round edge of the first type rib 32a as well as the inclined edge surface 62 of the second type rib and the second portion C2 of the third type rib 32c allows the assembly process of the LCD device to mount the LC panel unit 12 on the backlight unit 11 with ease.

Figure 7:
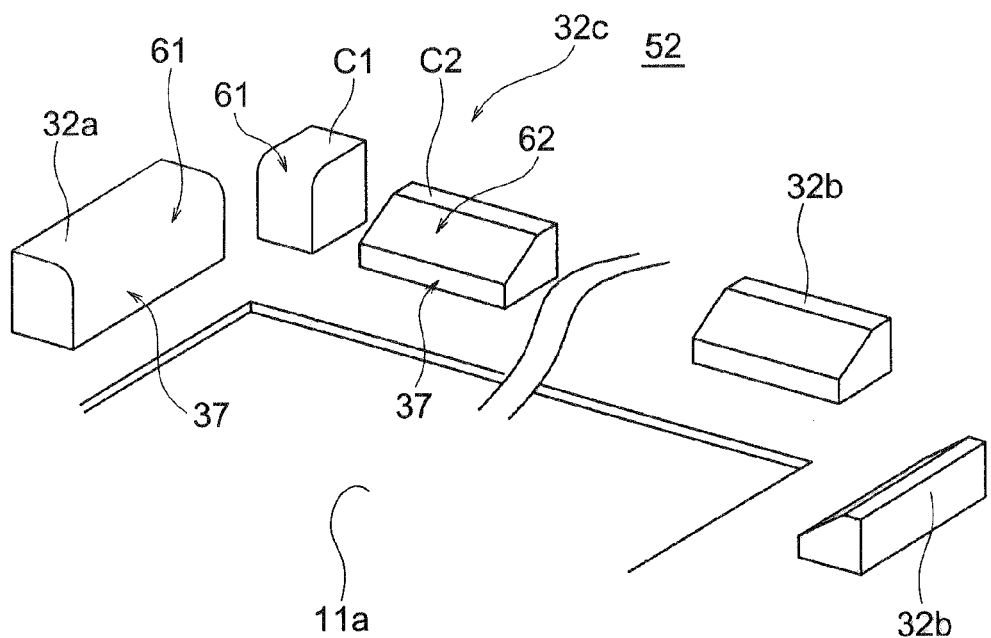
FIG. 7 is a perspective view showing, similarly to FIG. 5, the configuration of a LCD device according to a second modification of the first embodiment.

The third type rib 32c has the first portion C1 integrally formed with the second portion C2 in this modification; however, the first portion C1 may be formed separately from the second portion C2 in the third type rib 32c. FIG. 7 is a perspective view showing, similarly to FIG. 5, the configuration of a LCD device according to a second modification of the first embodiment. In the LCD device generally designated at numeral 52, the first portion C1 and the second portion C2 of the third type rib 32c are formed separately from each other, differently from the LCD device 51 shown in FIG. 6. The LC panel unit 12 having a smaller size and thus a relatively light weight, in addition to the smaller contact area between the edge portion of the display panel 21 and the positioning ribs 32, further suppresses the generation of dust.

Figure 8:
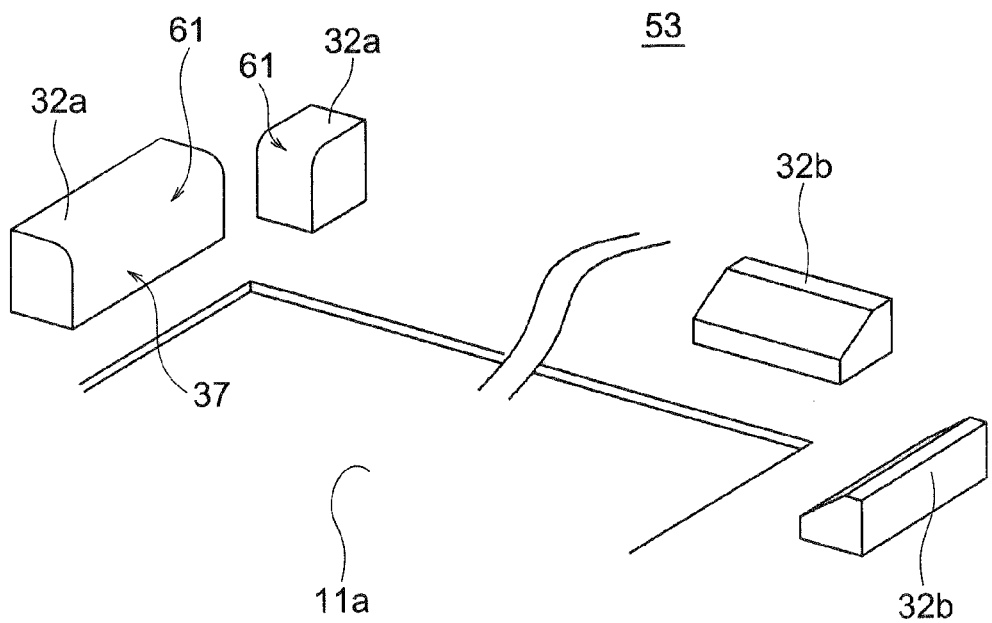
FIG. 8 is a perspective view showing, similarly to FIG. 5, the configuration of a LCD device according to a third modification of the first embodiment.

Adjacent to the boundary between the first edge portion 21a and the second edge portion 21b of the panel unit 12, it is possible to provide only the first portion C1 or the first type rib 32a for the panel unit 12. FIG. 8 is a perspective view showing, similarly to FIG. 5, the configuration of a LCD device according to a third modification of the first embodiment. In the LCD device generally designated at numeral 53, the second portion C2 of the third type rib 32c in the LCD device 51 shown in FIG. 6 is omitted, and thus only the first portion C1 or the first type rib 32a is provided in the third modification. If the LC panel unit 12 has a small size and a relatively light weight, the contact area between the edge portion of the display panel 21 and the positioning ribs 32 is small and thus further suppresses the generation of dust.

Figure 9:
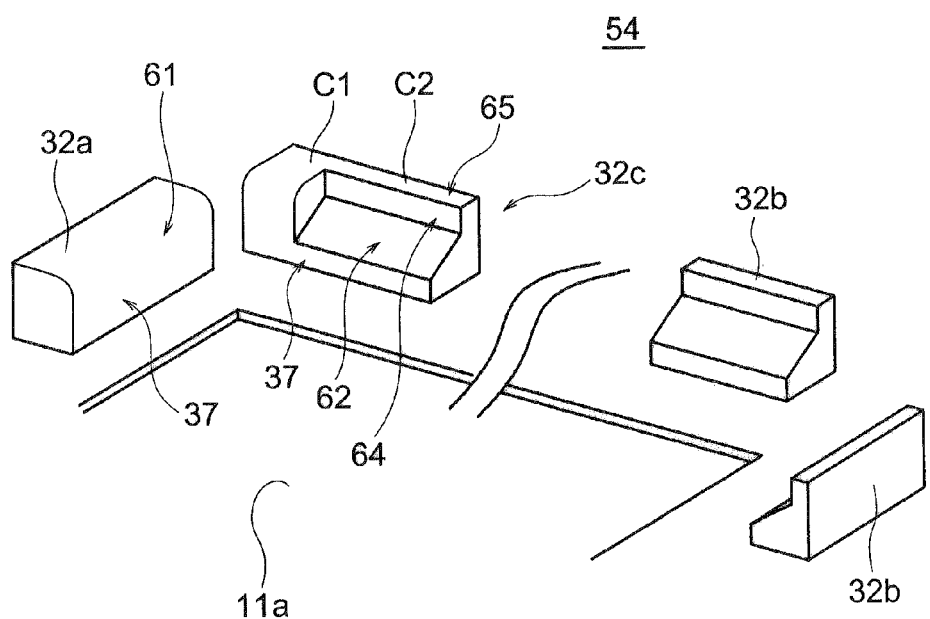
FIG. 9 is a perspective view showing, similarly to FIG. 5, the configuration of a LCD device according to a fourth modification of the first embodiment.

FIG. 9 is a perspective view showing the configuration of a LCD device according to a fourth modification of the first embodiment, similarly to FIG. 5. In the LCD device generally designated at numeral 54, a wall surface 64 parallel to the positioning wall 37 is formed to extend from the inclined edge surface 62 in the second portion C2 of the third type rib 32c, in addition to the configuration shown in FIG. 6. Further, a flat surface 65 is formed adjacent to the wall surface 64. The flat surface 65 is configured as the top surface of the portion C2, and the top of the first portion C1 and the top of the second portion C2 are flush with each other in the third type rib 32c.

In the LCD device 54 of the fourth modification, the wall surface 64 formed in the second portion C2 allows the assembly process of the LCD device to mount the LC panel unit 12 onto the backlight unit 11 with ease.

In the first embodiment and the first to fourth modifications thereof, there are shown examples in which the positioning ribs 32 are disposed in the vicinity of the corners of the display panel 21. However, the location of the positioning ribs 32 is not limited to those in he above configurations.

Figure 10:
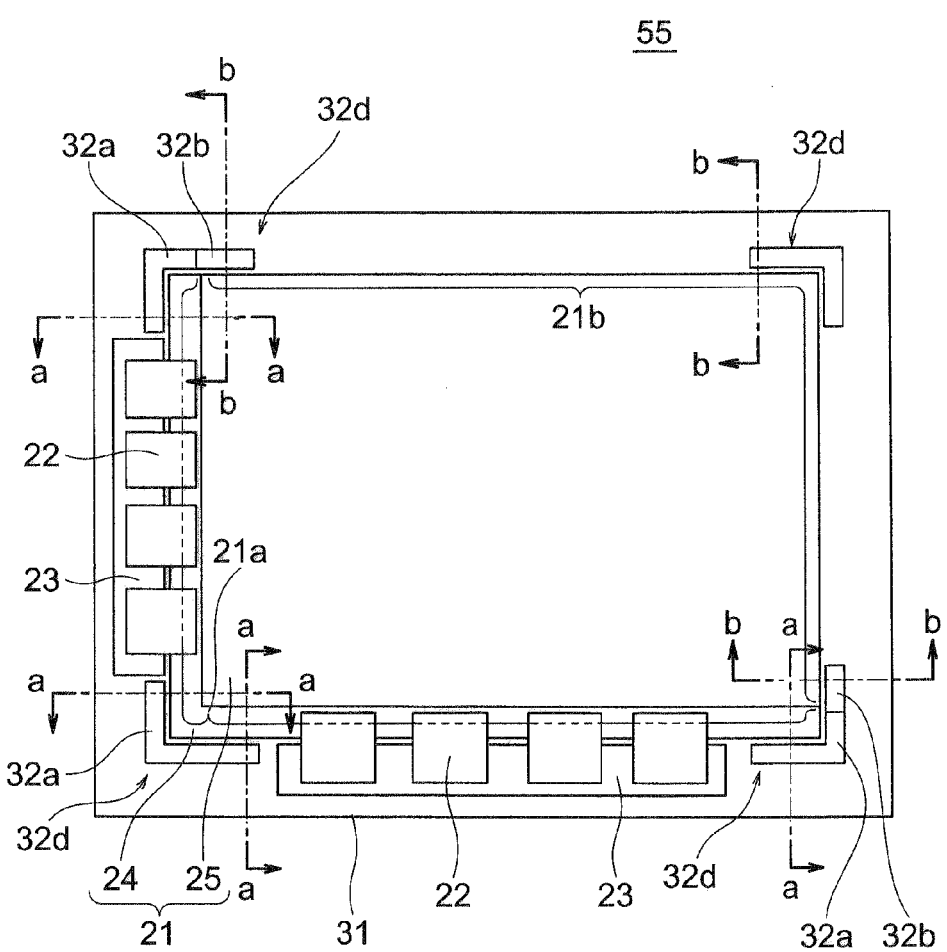
FIG. 10 is a top plan view showing, similarly to FIG. 2, the configuration of a LCD device according to a fifth modification of the first embodiment.
Figure 11:
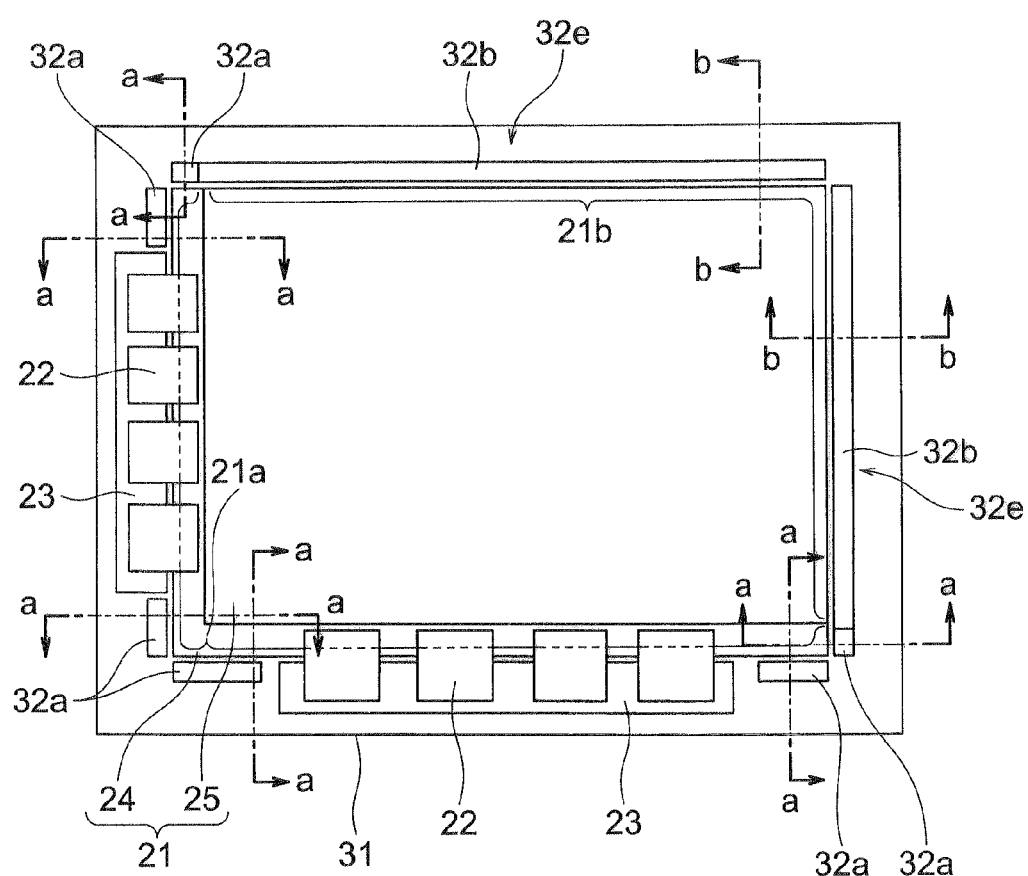
FIG. 11 is a top plan view showing the configuration of a LCD device according to a sixth modification of the first embodiment.
Figure 12:
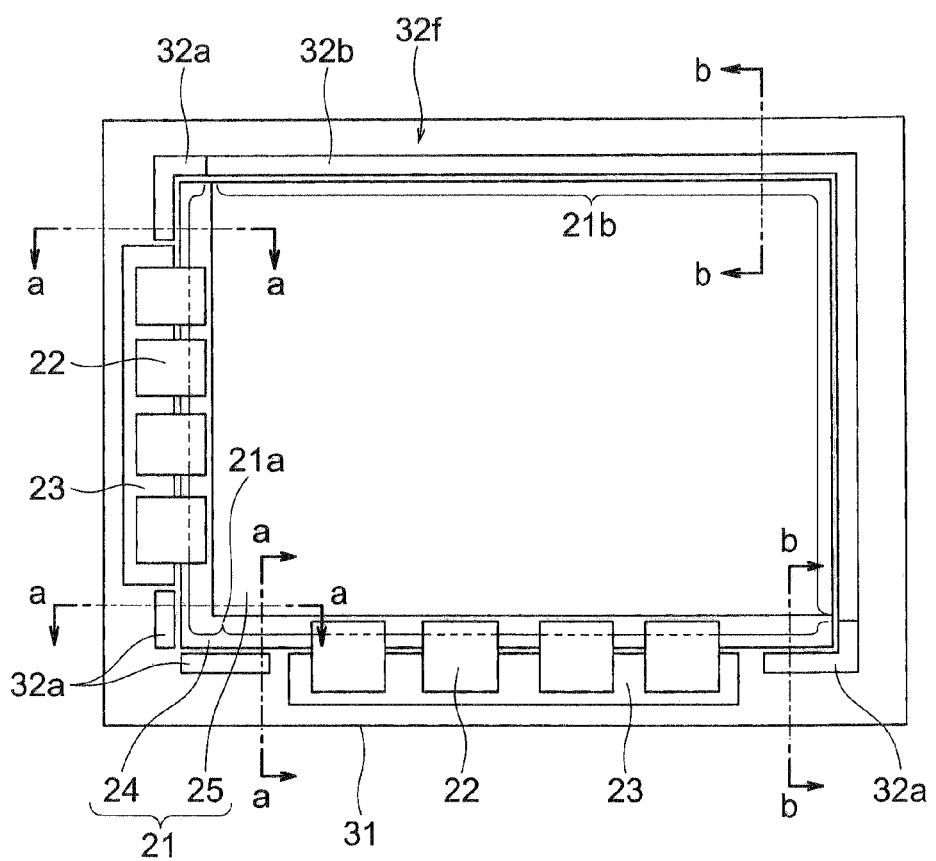
FIG. 12 is a top plan view showing, similarly to FIG. 2, the configuration of a LCD device according to a seventh modification of the first embodiment, similarly to FIG. 2.

FIGS. 10 to 12 are top plan views showing, similarly to FIG. 2, the configuration of LCD devices according to fifth to seventh modifications, respectively, of the first embodiment. In the LCD device 55 of FIG. 10, a corner rib 32d is formed for each of the corners of the display panel 21, wherein the corner rib 32d includes a first type rib 32a and a second type rib 32b integrally formed with each other to form a L-shaped corner, or includes only a first type rib 32a or a second type rib 32b having a L-shaped bent corresponding to the corner of the display panel 21. The first type rib 32a is provided corresponding to the first edge portion 21a, and the second type rib 32b is provided corresponding to the second edge portion 21b of the panel unit 12.

In the LCD device 56 shown in FIG. 11, straight positioning ribs 32e extend 32e along the sides of the display panel 21 except for the part of the first edge portion 21a wherein the TCPs 22 and the circuit board 23 are mounted. Each straight positioning rib 32e includes a first type rib 32a and a second type rib 32b integrally formed with each other.

In the LCD device 57 shown in FIG. 12, a single elongate positioning rib 32f includes a second type rib 32b extending along the second edge portion 21b and a pair of first type ribs 32a integrally formed with the ends of the second type rib 32b and disposed for the first edge portion 21a. Other first type positioning ribs 32a are disposed for the corner of the display panel 21 corresponding to the first edge portion 21a.

In those LCD devices 55 to 57 shown in FIGS. 10 to 12, as in the case of the LCD device 10 of the first embodiment, the first type rib 32a in the corner rib 32d, straight rib 32e and single elongate rib 32f has the first height equivalent to the height of the top surface of the counter substrate 25, whereas the second type rib 32b has the second height slightly lower than the height of the top surface of the TFT substrate 24.

Figure 13A:
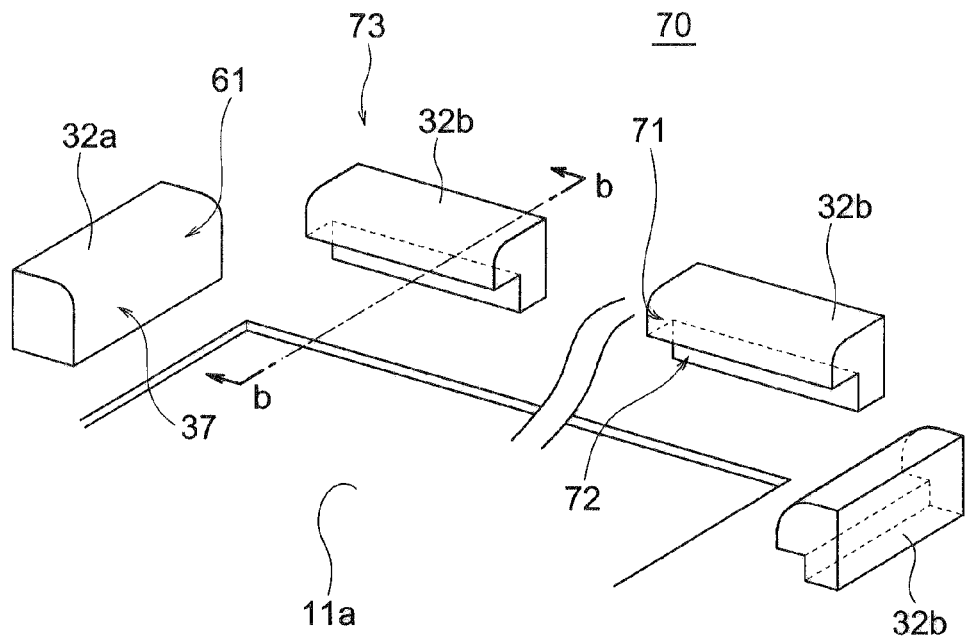
FIG. 13A is a perspective view showing, similarly to FIG. 5, the configuration of a LCD device according to a second embodiment of the present invention.
Figure 13B:
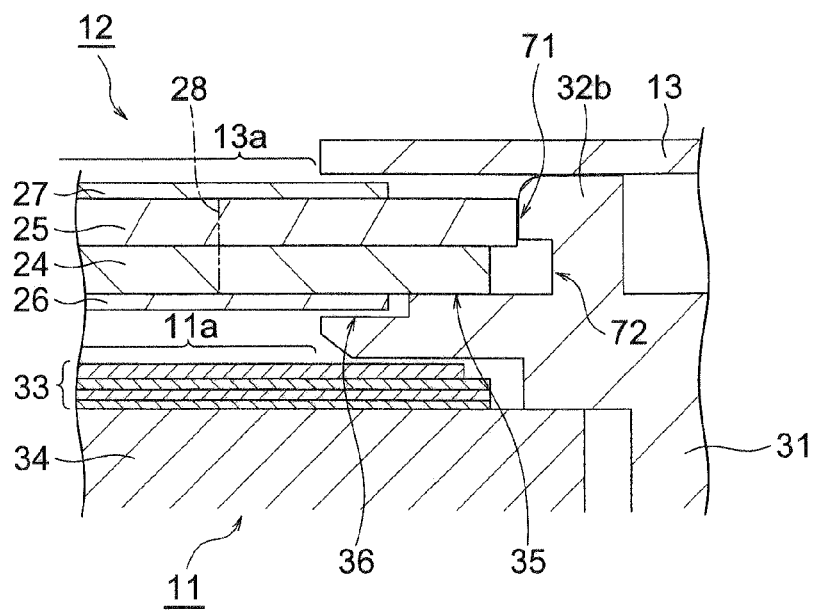
FIG. 13B is a sectional view taken along the line b-b of FIG. 13A.

FIG. 13A is a perspective view showing, similarly to FIG. 5, the configuration of a LCD device according to a second embodiment of the present invention. FIG. 13B is a sectional view taken along line b-b shown in FIG. 13A. In the LCD device generally designated at numeral 70, the second type rib 32b has a positioning wall 71 opposing the edge surface of the counter substrate 25, and a retracted wall 72 formed between the bottom of the second type rib 32b and the positioning wall 71. The retracted wall 72 is formed at a position retracted from the positioning wall 71 with respect to the display panel 21.

The distance between the surface of the positioning wall 71 and the surface of the retracted wall 72, as observed normal to the display panel 21, is set sufficiently larger than the range of misalignment estimated between the edge surface of the TFT substrate 24 and the edge surface of the counter substrate 25. The second type positioning ribs 32b are formed only in a portion opposing the second edge portion 21b of the display panel 21. The bottom surface of the positioning wall 71 is set higher than the boundary between the TFT substrate 24 and the counter substrate 25 and has a height of, for example, 0.9 mm, and the top surface of the second type rib 32b has a height of, for example, 1.6 mm.

The top inner portion of the positioning ribs 32 opposing the display panel 21 has a round edge. In the LCD device 70 of the present embodiment, since only part of the counter substrate 25 abuts the positioning ribs 32 at the second edge portion 21b of the display panel 21, the contact area between the display panel 21 and the positioning ribs 32 is small to reduce the dust formed by abrasion, as in the case of the first embodiment.

Figure 23A:
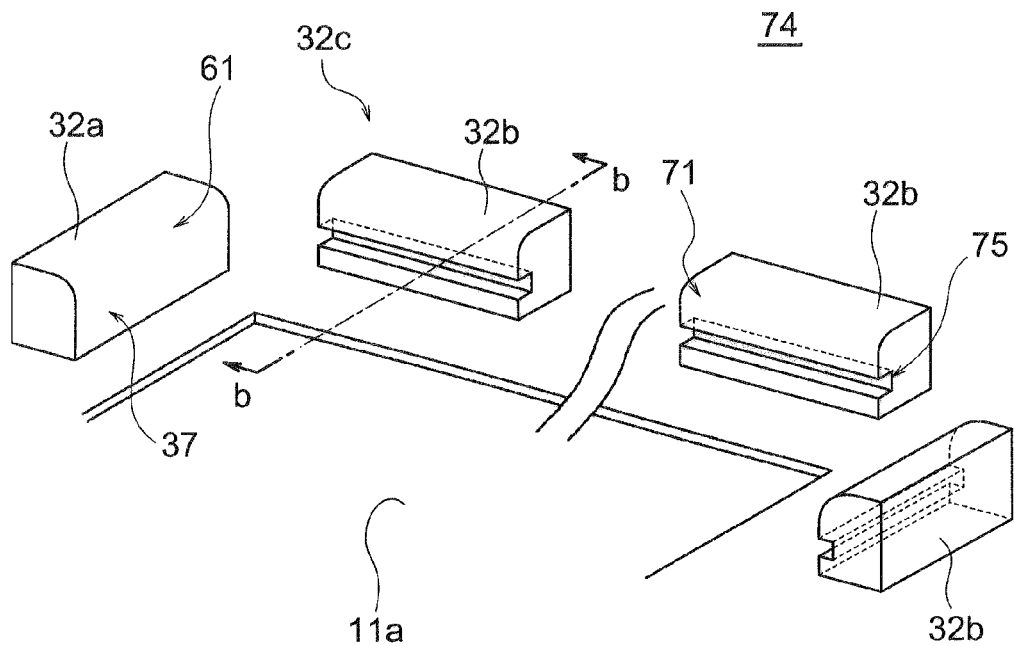
FIG. 23A is a perspective view of a LCD device according to a third embodiment of the present invention.
Figure 23B:
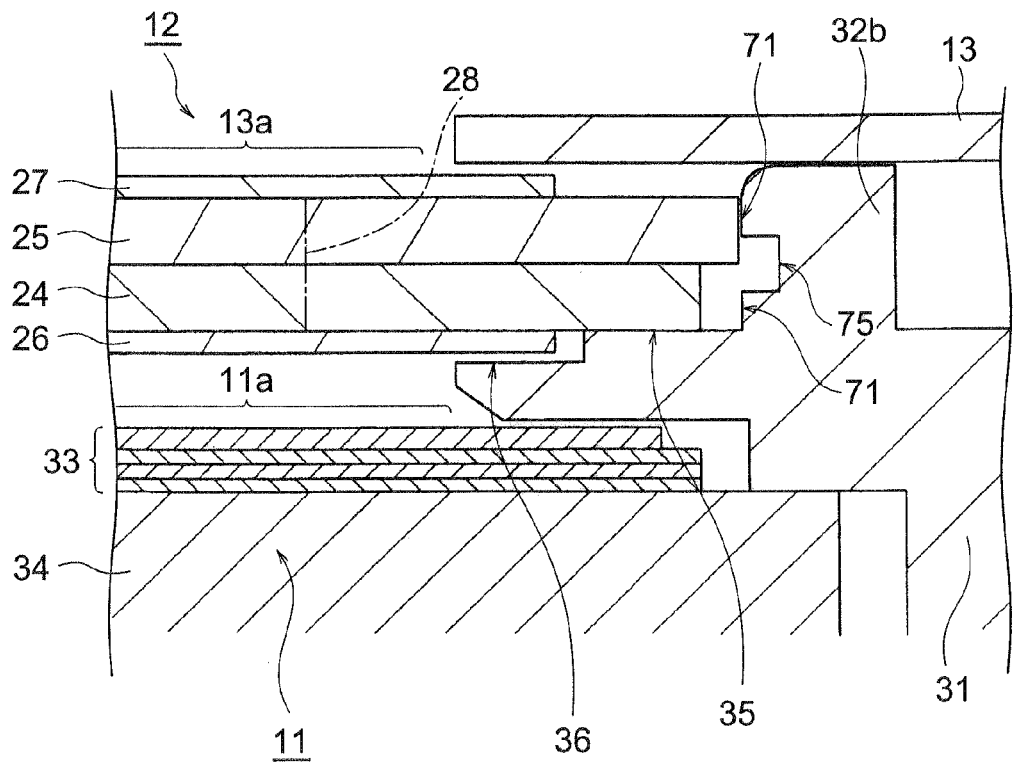
FIG. 23B is a sectional view taken along line b-b in FIG. 23A.

FIG. 23A shows in a perspective view, similarly to FIG. 5, a LCD device according to a third embodiment of the present invention, and FIG. 23B shows a sectional view taken along line b-b in FIG. 23B. The LCD device, generally designated at numeral 74, is similar to the LCD device 10 shown in FIG. 5 except that the second type positioning ribs 32b in the present embodiment include a second positioning wall 71 opposing the second outer edge portion 21b of the display panel 21 and a groove 75 formed on the second positioning wall 71 at the height where the bonding surface of the display panel 21 and the second positioning wall 71 intersect. One of the second type positioning ribs 32b positioned adjacent to the first type positioning ribs 32a opposes only the second outer edge portion 21b of the display panel 21. The bottom of the groove 75 configures a retracted wall of the second type positioning ribs 32b in the present embodiment.

The height of the center of the groove 75 with respect to the mounting surface 35 is substantially equal to the height of the bonding surface between the TFT substrate 24 and the counter substrate 25, and may be 0.7 mm for example. The groove 75 may have a width of 0.4 mm and a depth of 0.3 to 0.5 mm, whereas the top surface of the second type positioning rib 32b is 1.6 mm high, for example.

In a modification from the LCD device 74 of the present embodiment, the edge of the counter substrate 25 protrudes from the edge of the TFT substrate 24 in the second outer edge portion 21b of the display panel 21, and only a portion of the counter substrate 25 is in contact with the second positioning wall 71 at a location higher than the groove 75. In another modification from the LCD device 74 of the present embodiment, the edge of the TFT substrate 24 protrudes from the edge of the counter substrate 25 in the second outer edge portion 21b, and a portion of the TFT substrate 24 is in contact with the second positioning wall 71 at a location lower than the groove 75. In both the modifications, the contact area between the second type positioning ribs 32b and the display panel 21 is reduced compared to the conventional display panel, to thereby reduce the amount of dust caused by friction, as in the case of the second embodiment.

In another modification of the LCD device 74, the first type positioning rib 32a may have a groove similarly to the groove 75 formed on the second type positioning rib 32b.

The contact area may be adjusted by adjusting the location and width of the groove 75. In addition, in any of the cases where the edge of the TFT substrate protrudes and the edge of the counter substrate protrudes, the display panel 21 is positioned by the second positioning wall 71. Thus, these modifications are especially suited for the case of positioning based on the outer profile of the display panel. Although the groove 75 shown in FIG. 23B has a rectangular cross section, the cross section of the groove may be any of V-character, U-character, semi-circular and other shapes.

Figure 14:
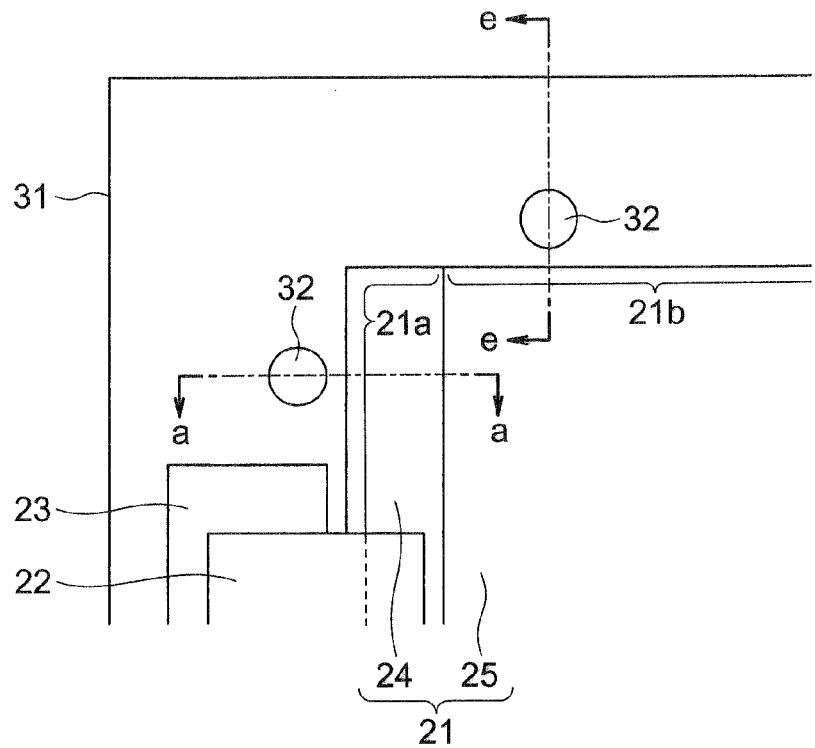
FIG. 14 is a top plan view showing, similarly to FIG. 4, the configuration of a LCD device according to a fourth embodiment of the present invention.

FIG. 14 is a top plan view showing, similarly to FIG. 4, the configuration of a LCD device according to a fourth embodiment of the present invention. The LCD device, generally designated at numeral 80, has a configuration similar to that of the conventional LCD device 100 shown in FIGS. 17 to 19 except for the shape of the positioning ribs 32 formed on the backlight unit 11 in the present embodiment. In the LCD device 80, the positioning ribs 32 have a cylindrical shape extending normal to the display panel 21.

The positioning ribs 32 have a height substantially equal to the height of the top surface of the counter substrate 25. The section taken along line a-a shown in FIG. 14 is similar to that shown in FIG. 3A, and the section taken along line e-e is similar to that shown in FIG. 19B.

According to the LCD device 80 of the present embodiment, the positioning ribs 32 having a cylindrical shape extending normal to the display panel 21 reduces the contact area between the edge of the display panel 21 and the positioning ribs 32, thereby suppressing the generation of dust due to abrasion or friction between the display panel 21 and the positioning ribs 32. Further, the top surface of the positioning ribs 32 having a height substantially equal to the height of the top surface of the counter substrate 25 prevents the display panel 21 from overriding the first type rib 32a by providing a sufficient large step difference needed for preventing the display panel 21 from overriding the first type rib 32a.

Figure 15:
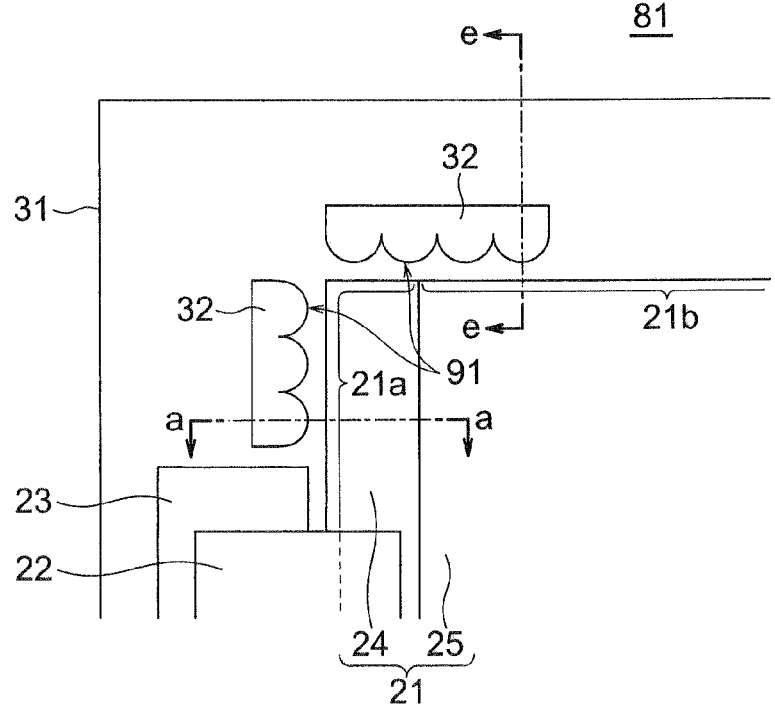
FIG. 15 is a top plan view showing, similarly to FIG. 14, the configuration of a LCD device according to a first modification of the fourth embodiment.

FIG. 15 is a top plan view showing, similarly to FIG. 14, the configuration of a LCD device according to a first modification of the fourth embodiment. In the LCD device generally designated at numeral 81, each of the positioning ribs 32 has a plurality of protrusions 91 protruding toward the edge surface of the display panel 21. The protrusions 91 have a semicircular shape as observed normal to the display panel 21, and are arranged at a regular pitch along the edge of the display panel 21.

The positioning ribs 32 have a uniform shape along the direction normal to the display pane 121 and have a height substantially equal to the height of the top surface of the counter substrate 25. The section taken along line a-a shown in FIG. 15 is similar to that shown in FIG. 3A, and the section taken along line e-e is similar to that shown in FIG. 19B. In the LCD device 81 of the present modification, the reliability of the positioning ribs 32 is improved in comparison to the LCD device 80 of the fourth embodiment by supporting the edge surface of the display panel 21 by the positioning ribs 32 having a plurality of protrusions 91, substantially without a significant increase of the contact area.

Figure 16:
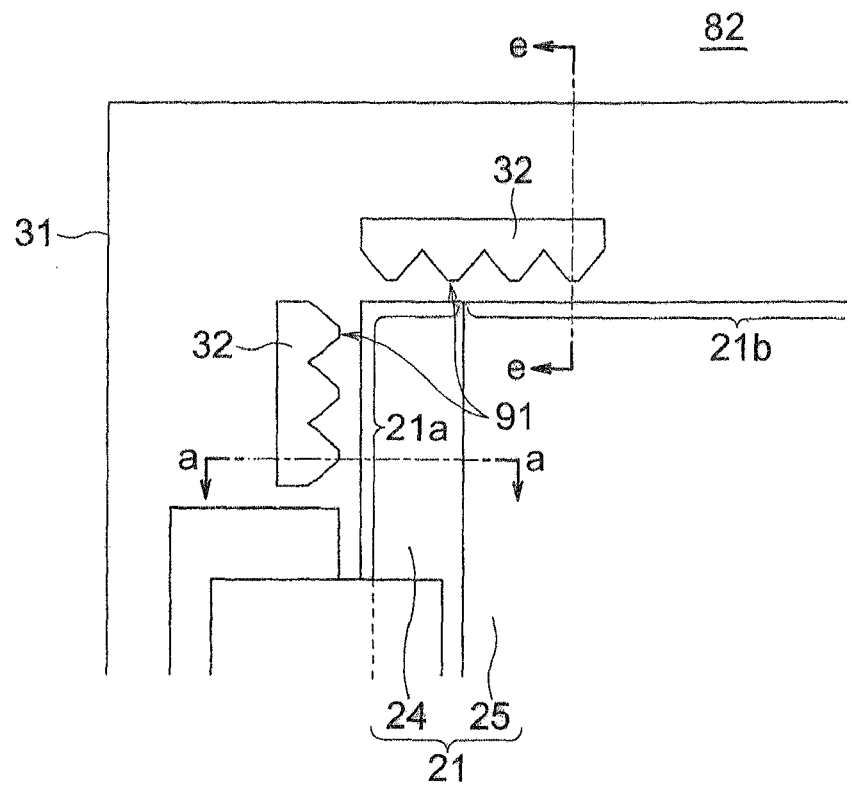
FIG. 16 is a top plan view showing, similarly to FIG. 14, the configuration of a LCD device according to a second modification of the fourth embodiment.

FIG. 16 is a top plan view showing, similarly to FIG. 14, the configuration of a LCD device according to a second modification of the fourth embodiment. In the LCD device generally designated at numeral 82, the protrusions 91 provided in the LCD device 81 of FIG. 15 are modified to have a V-character shape in FIG. 16. In the LCD device 82 of the present modification, the advantages similar to those in the LCD device 81 of the first modification can be obtained.

Further, in the LCD devices 80 to 82 shown in FIGS. 14 to 16, as in the case of the first embodiment, the positioning ribs 32 opposing the second edge portion 21b of the display panel 21 may have a positioning wall 37 having a height slightly lower than the height of the top surface of the TFT substrate 24. In an alternative, the positioning wall 71 opposing the edge surface of the counter substrate 25 may be provided, as in the case of the second embodiment. Such a configuration may provide a smaller contact area between the display panel 21 and the positioning ribs 32, thereby suppressing the generation of dust.

As described above, the present invention has been described based on the preferred embodiments thereof. However, the display device according to the present invention is not limited to the above-described embodiments, and the display devices to which various modifications and alterations have been applied in the configurations of the above-described embodiments will fall within the scope of the present invention. For example, the display device of the present invention is not limited to a LCD device, and may be applied to any of the display devices having the mounting surface and the positioning rib.

What is claimed is:

1. A display device comprising:
a display panel including first and second substrates consecutively layered on a chassis having at least one mounting surface, wherein said mounting surface is flat and contacts a back face of said display panel in the same plane, said display panel is mounted on said mounting surface, and, said first and second substrates are bonded together at a bonding surface, said display panel having a first panel portion in which an edge of said first substrate protrudes from an edge of said second substrate and a second panel portion in which an edge of said first substrate is substantially flush with an edge of said second substrate; and
a positioning rib set located on and protruding from said mounting surface to define a location for said display panel on said mounting surface, said positioning rib set including a first rib, protruding from said mounting surface, having a first positioning wall which opposes an edge of said first panel portion and has a height larger than a height of said bonding surface as observed from said mounting surface, and a second rib, protruding from said mounting surface, having a second positioning wall which opposes an edge of said second panel portion and has a height smaller than a height of said bonding surface as observed from said mounting surface.

2. The display device according to claim 1, wherein said display panel is of a rectangular shape, and one of sides of said display panel configuring both said first and second panel portions is associated with at least one said first rib and at least one said second rib.

3. The display device according to claim 1, wherein said first substrate is an active matrix substrate, and at least one tape carrier package (TCP) is coupled to an area of said first substrate in said first panel portion of said display panel.

4. The display device according to claim 1, wherein said display panel is of a rectangular shape, each corner of said display panel is associated with said first rib and/or said second rib formed separately from said first rib and/or said second rib associated with another corner, and least one corner of said display panel is associated with said first and second ribs formed separately from each other.

5. The display device according to claim 4, wherein one of corners other than said at least one corner of said display panel is associated with said first and second ribs formed separately with each other.

6. The display device according to claim 1, wherein said display panel is of a rectangular shape, each corner of said display panel is associated with said first rib and/or said second rib formed separately from said first rib and/or said second rib associated with another corner, and least one corner of said display panel is associated with said first and second ribs formed integrally with each other.

7. The display device according to claim 1, wherein said display panel is of a rectangular shape, and at least one side of said display panel is associated with a single piece of said second rib.

8. The display device according to claim 1, wherein said second rib has a slanted top surface extending from said second positioning wall.

9. The display device according to claim 1, wherein said second rib has a flat top surface extending from said second positioning wall.

10. The display device according to claim 1, wherein said second rib has a flat top surface extending from said second positioning wall.

11. A display device comprising:
a display panel including first and second substrates consecutively layered on a backlight unit having at least one mounting surface, wherein said mounting surface is flat and contacts a back face of said display panel in the same plane, said display panel is mounted on said mounting surface, and said first and second substrates are bonded together at a bonding surface, said display panel having a first panel portion in which an edge of said first substrate protrudes from an edge of said second substrate and a second panel portion in which an edge of said first substrate is substantially flush with an edge of said second substrate; and
a positioning rib set located on and protruding from said mounting surface to define a location for said display panel on said mounting surface, said positioning rib set including a first rib, protruding from said mounting surface, having a first positioning wall which opposes an edge of said first panel portion and has a height larger than a height of said bonding surface as observed from said mounting surface, and a second rib, protruding from said mounting surface, having a second positioning wall which abuts an edge of said second panel portion and has a height smaller than a height of said bonding surface as observed from said mounting surface.

12. The display device according to claim 11, wherein said display panel is of a rectangular shape, and one of sides of said display panel configuring both said first and second panel portions is associated with at least one said first rib and at least one said second rib.

13. The display device according to claim 11, wherein said first substrate is an active matrix substrate, and at least one tape carrier package (TCP) is coupled to an area of said first substrate in said first panel portion of said display panel.

14. The display device according to claim 11, wherein said display panel is of a rectangular shape, each corner of said display panel is associated with said first rib and/or said second rib formed separately from said first rib and/or said second rib associated with another corner, and least one corner of said display panel is associated with said first and second ribs formed integrally with each other.

15. The display device according to claim 11, wherein said display panel is of a rectangular shape, and at least one side of said display panel is associated with a single piece of said second rib.

* * * * *